(12) United States Patent
Batla et al.

(10) Patent No.: US 8,457,810 B1
(45) Date of Patent: Jun. 4, 2013

(54) COMPOUND STEERING LAW FOR EFFICIENT LOW THRUST TRANSFER ORBIT TRAJECTORY

(75) Inventors: Fawwad M. Batla, Yorba Linda, CA (US); Yiu-Hung M. Ho, Palos Verdes Estates, CA (US)

(73) Assignee: The Boeing Company, Chicago, IL (US)

( * ) Notice: Subject to any disclaimer, the term of this patent is extended or adjusted under 35 U.S.C. 154(b) by 201 days.

(21) Appl. No.: 13/087,280

(22) Filed: Apr. 14, 2011

(51) Int. Cl.
*G05D 3/00* (2006.01)
*B64G 1/10* (2006.01)

(52) U.S. Cl.
USPC .......................................... 701/13; 244/158.4

(58) Field of Classification Search
USPC ...................... 701/13; 244/3.1, 50, 51, 62, 63, 244/158.1, 158.4, 158.5, 158.6, 171.3; 342/62
See application file for complete search history.

(56) References Cited

U.S. PATENT DOCUMENTS

| | | | |
|---|---|---|---|
| 5,199,672 A * | 4/1993 | King et al. | 244/173.3 |
| 5,595,360 A | 1/1997 | Spitzer | |
| 6,213,432 B1 * | 4/2001 | Koppel | 244/158.5 |
| 6,341,749 B1 * | 1/2002 | Ocampo | 244/158.5 |
| 6,937,968 B1 * | 8/2005 | Carrico et al. | 703/8 |
| 7,918,420 B2 * | 4/2011 | Ho | 244/169 |
| 8,282,043 B2 * | 10/2012 | Ho | 244/158.8 |
| 2008/0237399 A1 * | 10/2008 | Caplin et al. | 244/158.4 |
| 2009/0078829 A1 * | 3/2009 | Ho et al. | 244/169 |

* cited by examiner

*Primary Examiner* — Mary Cheung
(74) *Attorney, Agent, or Firm* — Vista IP Law Group LLP; Cynthia A. Dixon (57) ABSTRACT

A method and system for application of a compound steering law for efficient low thrust transfer orbit trajectory for a spacecraft are disclosed. The method involves calculating, with at least one processor, a desired orbit for the spacecraft. The method further involves calculating a velocity change required to achieve an orbit eccentricity and a velocity change required to achieve a semi-major axis, both of which correspond to the desired orbit for the spacecraft. Also, the method involves calculating the direction of the vector sum of the velocity change required to achieve the orbit eccentricity and the velocity change required to achieve the semi-major axis. Further, the method involves firing at least one thruster of the spacecraft in the direction of the vector sum in order to change the current orbit of the spacecraft to the desired orbit for the spacecraft, thereby changing the orbit eccentricity and the semi-major axis simultaneously.

20 Claims, 7 Drawing Sheets

$$\vec{f} = \frac{\Delta \vec{V}_{ecc} + \Delta \vec{V}_{sma}}{|\Delta \vec{V}_{ecc} + \Delta \vec{V}_{sma}|}$$

FIG. 3

$\vec{f}' = \vec{f}$
but with the second component of $\vec{f}'$ set to
$f'(2) = x f(2)$
where $$x = \left(1 + w \cos\left(\frac{tru}{2}\right)\right)$$

$$w = \left|\left(\frac{\Delta V_{sma}}{\Delta V_{ecc}}\right)\right|^{1/3}$$

FIG. 4

| Case Type | Standard Strategy TOD (day) | Conventional Strategy TOD (day) | Compound Steering TOD (day) | Refined Compound Steering TOD (day) | XIPSTOP TOD (day) | TOD Savings |
|---|---|---|---|---|---|---|
| Baseline Geosynch Eccentric | 110.6 | N/A | N/A | N/A | 108.1 | 2.3% |
| Baseline Subsynch Eccentric | 115.9 | 114.1 | 106.7 | 106.7 | 107.7 | 7.9% |
| Baseline Supersynch Eccentric | 40.7 | 40.9 | 36.4 | 35.3 | 35.2 | 13.3% |
| Validation Subsynch Eccentric 1 | 28.2 | 26.5 | 24.4 | 24.4 | 25.8 | 13.5 |
| Validation Subsynch Eccentric 2 | 33.1 | 34.7 | 30.4 | 30.4 | 29.3 | 8.2% |
| Validation Subsynch Eccentric 3 | 29.9 | 35.7 | 29.3 | 29.2 | 28.8 | 2.3% |
| Validation Supersynch Eccentric 1 | 35.7 | 36.7 | 33.8 | 33.3 | 33.0 | 6.7% |
| Validation Supersynch Eccentric 2 | 24.7 | 29.8 | 24.1 | 23.9 | 23.5 | 3.2% |
| Real World Mission Example | 113.6 | 116.2 | 97.3 | 94.6 | 94.8 | 16.7% |

COMPOUND STEERING LAW FOR EFFICIENT LOW THRUST TRANSFER ORBIT TRAJECTORY

GOVERNMENT LICENSE RIGHTS

This invention was made with Government support under contract number FA 8808-04-C-0022 awarded by the Department of Defense. The government has certain rights in this invention.

BACKGROUND

The present disclosure relates to compound steering laws. In particular, it relates to compound steering laws for efficient low thrust transfer orbit trajectories.

SUMMARY

The present disclosure relates to a method, system, and apparatus for application of a compound steering law for efficient low thrust transfer orbit trajectory for a spacecraft. In particular, the disclosed method involves calculating, with at least one processor, a desired orbit for the spacecraft. The method further involves calculating, with at least one processor, a velocity change required to achieve an orbit eccentricity that corresponds to the desired orbit for the spacecraft. Also, the method involves calculating, with at least one processor, a velocity change required to achieve a semi-major axis that corresponds to the desired orbit for the spacecraft. In addition, the method involves calculating, with at least one processor, the direction of the vector sum of the velocity change required to achieve the orbit eccentricity and the velocity change required to achieve the semi-major axis. Further, the method involves firing at least one thruster of the spacecraft in the direction of the vector sum in order to change the current orbit of the spacecraft to the desired orbit for the spacecraft, thereby changing the orbit eccentricity and the semi-major axis simultaneously.

In at least one embodiment, the spacecraft is a satellite, a pseudo satellite, a rocket, a space vehicle, and/or a space plane. In one or more embodiments, the spacecraft employs a liquid propulsion system (LPS) and/or an electrical propulsion system (EPS). In at least one embodiment, the EPS is a xenon-ion propulsion system (XIPS). In some embodiments, the LPS employs a monopropellant and/or a bipropellant.

In one or more embodiments, the method is performed during a transfer orbit mission for the spacecraft. In some embodiments, the transition orbit mission changes from a low Earth orbit (LEO), a medium Earth orbit (MEO), a geosynchronous Earth orbit (GEO), a highly elliptical orbit (HEO), an inter-planetary orbit, or a lunar orbit mission to a target LEO, MEO, GEO, HEO, inter-planetary orbit, or lunar orbit for the spacecraft. In at least one embodiment, the transition orbit mission changes an initial geo-synchronous eccentric orbit of the spacecraft to a target geo-synchronous circular orbit for the spacecraft. In some embodiments, the transition orbit mission changes an initial sub-synchronous eccentric orbit of the spacecraft to a target geo-synchronous circular orbit for the spacecraft. In other embodiments, the transition orbit mission changes an initial super-synchronous eccentric orbit of the spacecraft to a target geo-synchronous circular orbit for the spacecraft.

In at least one embodiment, the disclosed method is performed during an on-station mission for the spacecraft. In some embodiments, the method is performed with a fixed transfer orbit duration (TOD) in order to maximize payload capacity. In one or more embodiments, the method is performed with a variable TOD in order to minimize TOD for a fixed payload capacity.

In one or more embodiments, a method for application of a compound steering law for efficient low thrust transfer orbit trajectory for a spacecraft involves calculating, with at least one processor, a desired orbit for the spacecraft. Also, the method involves calculating, with at least one processor, a velocity change required to achieve an orbit eccentricity that corresponds to the desired orbit for the spacecraft. In addition, the method involves calculating, with at least one processor, a velocity change required to achieve a semi-major axis that corresponds to the desired orbit for the spacecraft. Additionally, the method involves calculating, with at least one processor, the direction of the vector sum of the velocity change required to achieve the orbit eccentricity and the velocity change required to achieve the semi-major axis.

The disclosed method further involves, calculating, with at least one processor, a factor w that is a function of the absolute value of the velocity change required to achieve the semi-major axis divided by the velocity change required to achieve the orbit eccentricity. In addition, the method involves calculating, with at least one processor, a factor x that is a function of the orbit true anomaly angle of the current orbit for the spacecraft. Further, the method involves firing at least one thruster of the spacecraft in the direction of the vector sum times the factor x in order to change the current orbit of the spacecraft to the desired orbit for the spacecraft, thereby changing the orbit eccentricity and the semi-major axis simultaneously.

In one or more embodiments, a system for application of a compound steering law for efficient low thrust transfer orbit trajectory for a spacecraft involves at least one processor and thrusters on the spacecraft. In particular, at least one processor is configured for calculating a desired orbit for the spacecraft. Also, at least one processor is further configured for calculating a velocity change required to achieve an orbit eccentricity that corresponds to the desired orbit for the spacecraft, and a velocity change required to achieve a semi-major axis that corresponds to the desired orbit for the spacecraft. In addition, at least one processor is further configured for calculating the direction of the vector sum of the velocity change required to achieve the orbit eccentricity and the velocity change required to achieve the semi-major axis. Additionally, at least one thruster on the spacecraft is configured for firing in the direction of the vector sum in order to change the current orbit of the spacecraft to the desired orbit for the spacecraft, thereby changing the orbit eccentricity and the semi-major axis simultaneously.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

DESCRIPTION

Figure 1A:
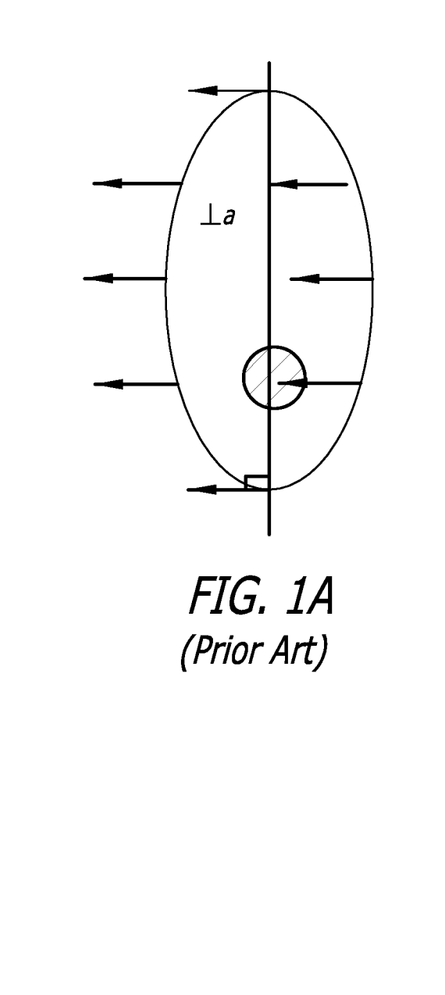
FIG. 1A shows the prior art steering law for an acceleration component that is perpendicular to the line of apoapse ($\perp a$; fixed inertial) of the spacecraft's orbit.
Figure 1B:
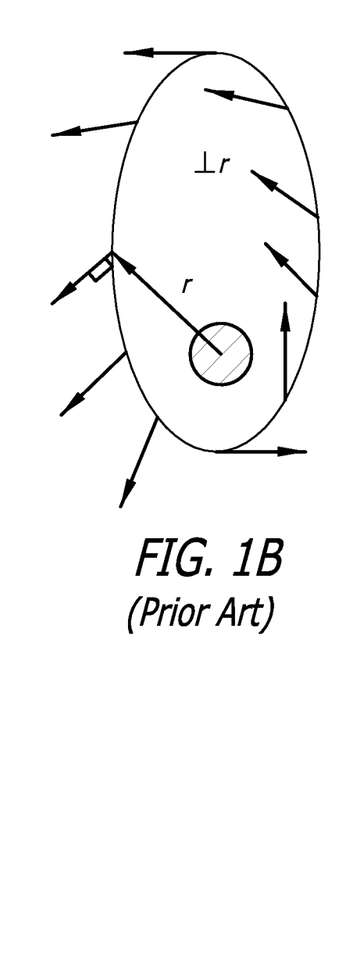
FIG. 1B shows the prior art steering law for an acceleration component that is perpendicular to the radius vector ($\perp r$) of the spacecraft's orbit.
Figure 1C:
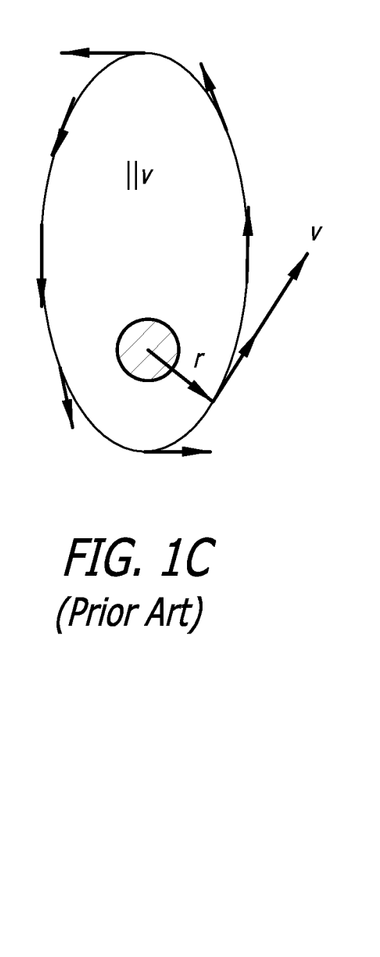
FIG. 1C shows the prior art steering law for an acceleration component that is along the velocity/anti-velocity vector (∥v) of the spacecraft's orbit.

Currently, there are three commonly used steering laws that are used for low-thrust transfer-orbit missions for spacecrafts. These three prior art steering laws are depicted in FIGS. 1A, 1B, and 1C. These three steering methodologies are used to determine the direction of the in-plane component of acceleration to be applied to the spacecraft during a transfer orbit mission. Specifically, FIG. 1A shows the steering law for an acceleration component that is perpendicular to the line of apoapse (⊥a; fixed inertial); FIG. 1B shows the steering law for an acceleration component that is perpendicular to the radius vector (⊥r); and FIG. 1C shows the steering law for an acceleration component that is along the velocity/anti-velocity vector (∥v). The applicability of any of these three steering laws for a transfer orbit mission is a function of the initial orbit of the spacecraft.

Each of these three prior art steering laws is used to achieve a specific orbit objective. In particular, the steering law depicted in FIG. 1A is used for targeting the orbital eccentricity, and the steering laws depicted in FIGS. 1B and 1C are used for targeting the orbital semi-major axis. With a few exceptions, these steering laws and their objectives are exclusive of each other and, thus, there is a conflict between them when it is desirable to achieve targets for both the semi-major axis and the orbit eccentricity parameters. For this reason, a typical solution and practice is to divide the mission into distinct phases, with each phase employing a different steering law, in order to achieve the respective orbital targets. As such, the total mission duration is the sum of the duration of each phase that is performed for the mission. The total mission duration can be relatively long when both of the orbital parameters (i.e. the orbit eccentricity and the semi-major axis of the initial orbit) are far from their targets. In addition, it should be noted that switching between different steering strategies during the mission requires reconfiguration of the spacecraft's control systems and large changes to the spacecraft's orientation. Thus, frequent switching between steering laws in every orbit or between different phases during transfer orbit poses operational complexities, including a significant amount of down or no-burn time, which renders the existing solution cumbersome.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

The present disclosure teaches a compound steering law, which combines the individual effects of the steering strategies depicted in FIGS. 1A and 1C. This compound steering law makes it possible to more efficiently accomplish both of the orbital objectives, namely the orbital eccentricity and the semi-major axis targets, simultaneously while allowing for a continuous or near continuous firing of the spacecraft's thrusters and for a smooth transition of the spacecraft's orientation.

The disclosed compound steering law has a number of advantages over the existing prior art steering laws. One advantage is that, while the existing prior art steering strategies impart the required changes to the orbit semi-major axis and eccentricity in a piece-meal fashion, the disclosed compound steering law can accomplish both objectives (i.e. the orbital eccentricity and the semi-major axis targets) efficiently at the same time. Instead of discontinuous segments and abrupt changes in the spacecraft's steering and configuration, the disclosed compound steering law enables continuous firing of the spacecraft's thrusters and a smooth transition of the spacecraft's orientation. Another advantage is that, except for extreme cases when one of the orbital objectives is predominating, the disclosed compound steering law reduces the total transfer orbit mission duration (TOD) as compared to the existing prior art solutions.

Alternatively, for a fixed TOD, the disclosed compound steering law increases the total mass-to-orbit as compared to the prior art existing solutions. Furthermore, the disclosed compound steering law also enables efficient management of environmental effects such as eclipse and atmospheric drag. This is because it minimizes the TOD penalty as a result of eclipses and/or atmospheric drag encountered during transfer orbit since neither balancing coasts nor global re-optimization of the mission is required with the compound steering law, thus providing a more robust and efficient mission. Moreover, in situations where the semi-major axis of an orbit is undesirably affected by an unmodeled force, the disclosed compound steering strategy counters the effect of the force during the course of the transfer orbit with minimal impact to the TOD. Lastly, the disclosed compound steering law enables targeting of longitude in a geo-stationary orbit in addition to the semi-major axis and eccentricity parameters with a single continuous maneuver.

When implemented, the disclosed compound steering law will serve to enhance both the current mass-to-orbit capability and the mission life salvage capability if contingencies arise during the transfer orbit mission. For example, assume a Boeing 702HP satellite standard transfer orbit mission, which includes both a bipropellant transfer orbit mission phase and a low thrust electric propulsion transfer orbit mission phase. In addition, the Boeing 702HP satellite also uses electric propulsion for on-station orbital operations during lifetime. In a first scenario, a pre-EPS phase orbit can be optimized prior to launch when using the disclosed compound steering law. This is because the disclosed compound steering law offers a significant mass-to-orbit advantage over the nominal mass by being able to offload bipropellant rather than having to fill the bipropellant tanks to capacity, as is normally necessary with the use of other prior art steering law(s). The trade would be more mass-to-orbit versus less EPS phase TOD. In a second scenario, if the liquid apogee engine/motor/thruster malfunctions at the end of the apogee burn block, but before starting the perigee maneuvers, during the bipropellant transfer orbit mission phase, the disclosed compound steering law based EPS transfer strategy would minimize the resulting TOD penalty while maximizing the remaining on-station spacecraft life.

As previously mentioned, the existing prior art low thrust transfer orbit strategies are based on a decoupled optimization of the required changes for the orbit semi-major axis and eccentricity (i.e. only one parameter change is optimized at a time, while the other parameter changes as a by-product of the first). As such, multiple spacecraft maneuvers comprised of multiple steering laws are required to achieve the target orbit semi-major axis and eccentricity. However, with the disclosed compound steering law, the ΔV (i.e. change in velocity) impartation direction can be constantly optimized such that it results in a constant and simultaneous change to both of the orbital parameters (i.e. the orbit semi-major axis and eccentricity) as a function of the transfer orbit duration.

Figure 2:
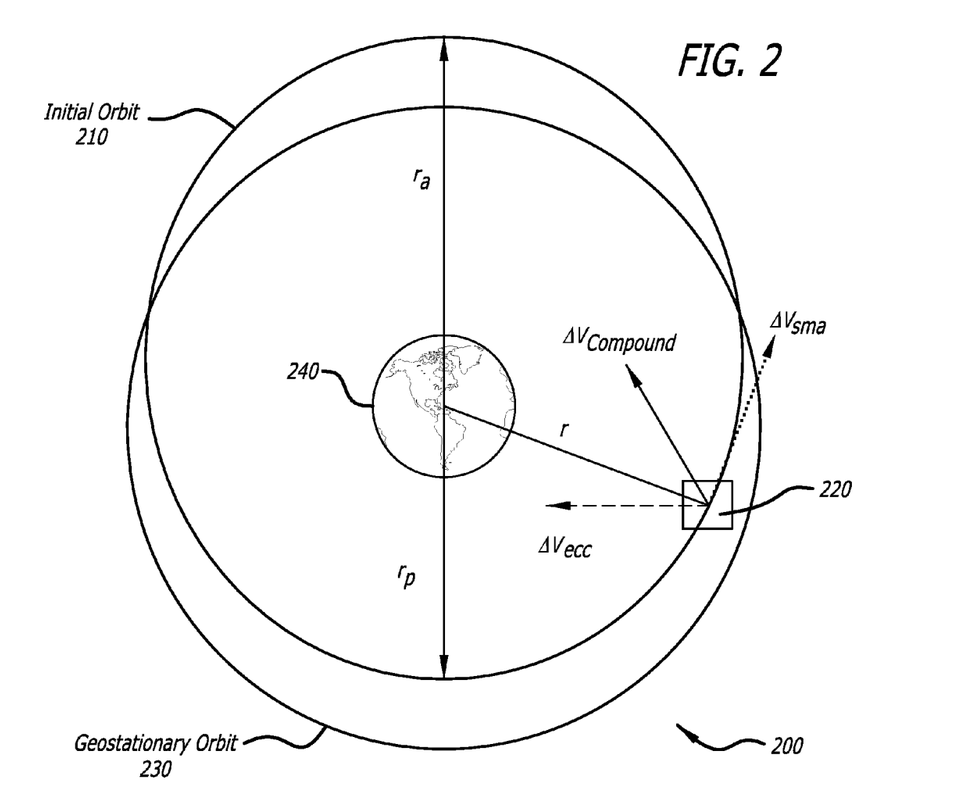
FIG. 2 illustrates a schematic diagram of the disclosed compound steering law being employed to change an initial sub-synchronous eccentric orbit of the spacecraft to a target geo-synchronous circular orbit for the spacecraft, in accordance with at least one embodiment of the present disclosure.

FIG. 2 illustrates a schematic diagram 200 of the disclosed compound steering law being employed to change an initial sub-synchronous eccentric orbit 210 of the spacecraft 220 to a target geo-synchronous circular orbit 230 for the spacecraft 220, in accordance with at least one embodiment of the present disclosure. In particular, this diagram 200 illustrates the compound steering direction ($\Delta V_{compound}$) that is required for a sub-synchronous eccentric initial orbit 210 with a target geo-stationary orbit 230.

In FIG. 2, the spacecraft 220 is shown to be orbiting the Earth 240 with an initial sub-synchronous eccentric orbit 210. The initial sub-synchronous eccentric orbit 210 has an apogee radius ($r_a$) and a perigee radius ($r_p$). In addition, the spacecraft is shown to have a radius (r) to the Earth 240. The compound steering direction ($\Delta V_{compound}$) is the direction of the vector sum of the change in velocity required to achieve the target semi-major axis ($\Delta V_{sma}$) and the change in velocity required to achieve the target orbit eccentricity ($\Delta V_{ecc}$). The spacecraft's thrusters are fired in the compound steering direction ($\Delta V_{compound}$) in order to change the current orbit 210 of the spacecraft 220 (i.e. the sub-synchronous eccentric initial orbit 210) to the target orbit 230 for the spacecraft 220 (i.e. the target geo-stationary orbit 230).

Figure 3:
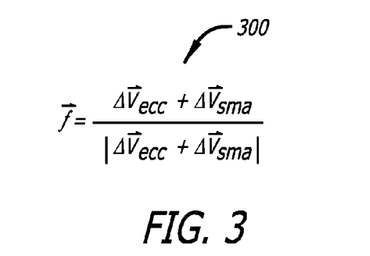
FIG. 3 shows the formula for the disclosed compound steering law for efficient low thrust transfer orbit trajectories, in accordance with at least one embodiment of the present disclosure.

FIG. 3 shows the formula 300 for the disclosed compound steering law for efficient low thrust transfer orbit trajectories, in accordance with at least one embodiment of the present disclosure. For the formula 300 in this figure, $\vec{f}$ is the direction of the thrust to be applied to the spacecraft at any point in orbit in order to achieve the target orbital parameters (i.e. $\vec{f}$ is the unit vector for the direction of applied dV). Also for this formula 300, $\Delta \vec{V}sma$ is the direction along or opposite to the orbital velocity vector in the non-inertial orbital frame, and $\Delta \vec{V}ecc$ is the direction perpendicular to the line of apses in the inertial frame.

Figure 4:
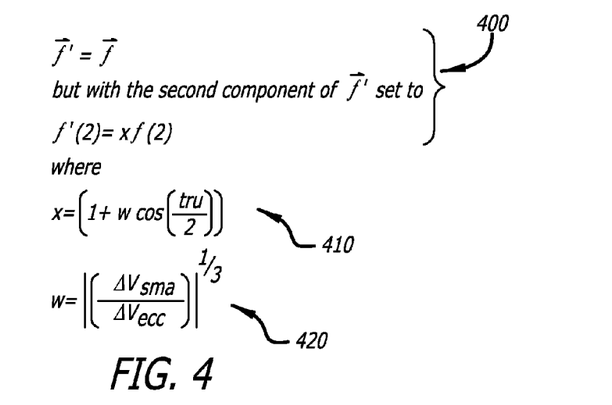
FIG. 4 shows the formula for the disclosed refined compound steering law for efficient low thrust transfer orbit trajectories as well as shows some other related formulas, in accordance with at least one embodiment of the present disclosure.

FIG. 4 shows the formula 400 for the disclosed refined compound steering law for efficient low thrust transfer orbit trajectories as well as shows some other related formulas 410, 420, in accordance with at least one embodiment of the present disclosure. Although the compound steering law of FIG. 3 affords considerable TOD savings relative to standard prior art steering laws, the refined compound steering law of FIG. 4 is slightly more efficient than the compound steering law of FIG. 3.

For the formula 400 in this figure, $\vec{f}$ represents the direction of the thrust to be applied to the spacecraft at any point in orbit in order to achieve the target parameters. Formula 400 describes $\vec{f}$. In formula 410, x is a factor to be used by formula 400, w is a factor to be optimized for each unique transfer orbit case, and tru is the orbit true anomaly angle of the spacecraft's initial orbit. Alternatively, formula 420 can be used to calculate a value for factor w to be used for formula 410, where $\Delta V_{sma}$ is the change in velocity required to achieve the target semi-major axis and $\Delta V_{ecc}$ is the change in velocity required to achieve the target orbit eccentricity.

Figure 5:
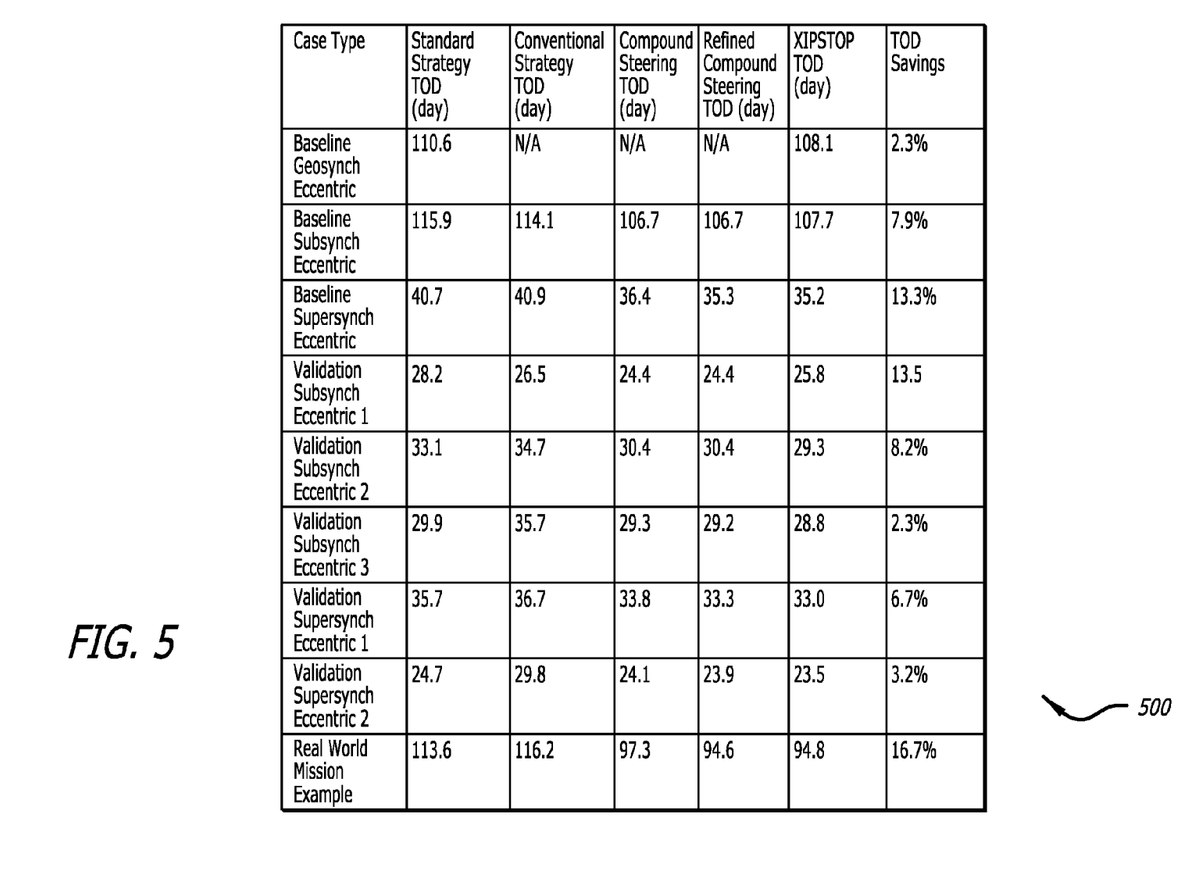
FIG. 5 illustrates a chart containing a comparison of the different transfer orbit durations for various cases using different steering laws, in accordance with at least one embodiment of the present disclosure.

FIG. 5 illustrates a chart 500 containing a comparison of the different transfer orbit durations for various cases using different steering laws, in accordance with at least one embodiment of the present disclosure. The Boeing S&IS (Space and Intelligence Systems) Astrodynamics department's analysis and operations tool called XIPSTOP (Xenon Ion Propulsion System Trajectory Optimization Program) was used to simulate the various cases in order to obtain the data presented in the chart 500. XIPSTOP is a flight-proven high-fidelity trajectory optimization tool, and despite its name's suggestion of being limited to XIPS, is a generic optimizer. XIPSTOP is a high-fidelity transfer-orbit trajectory optimization tool which makes use of segments (i.e. the entire transfer orbit mission is divided into multiple segments, and each segment is individually optimized in order to achieve the final target orbit). Each segment is comprised of coast duration, burn duration, firing attitude, thruster pair, and various other constraints related to these and other parameters.

Initially, three transfer orbit missions were simulated. These missions have a geo-synchronous eccentric initial orbit, a sub-synchronous eccentric initial orbit, and a super-synchronous eccentric initial orbit, and all three missions have a target geo-synchronous circular orbit. Then, six more cases were simulated to validate the compound steering law based on the TOD results. The differences found between the TOD results based on the compound steering law and the fully optimized transfer orbit test results from XIPSTOP were in good agreement, and most of the differences were within the numerical error of the computational methods. Furthermore, both the compound steering law and XIPSTOP TOD values were smaller when compared to the standard and conventional strategies. The chart 500 illustrates these results.

For chart 500, the "Standard Strategy" assumes that both the orbit eccentricity and the semi-major axis targets are achieved in distinct phases over the transfer orbit duration in series, and the order of the phases is dependent on the initial orbit. The "Conventional Strategy" implies that both the orbit eccentricity and the semi-major axis targets are achieved in piece-meal fashion by using different steering strategies over each revolution, and repeating this pattern throughout the transfer orbit duration. The "Compound Steering" TOD means that the disclosed compound steering law was used to obtain the numbers. The "Refined Compound Steering" TOD uses the disclosed refined compound steering law, which is essentially the disclosed compound steering law with fine-tuning applied to it. Lastly, the "XIPSTOP" TOD designates the XIPSTOP tool's optimized solution based results. The TOD savings were arrived at by comparing the "Standard" TOD values to the "Refined Compound Steering" TOD values.

Figure 6:
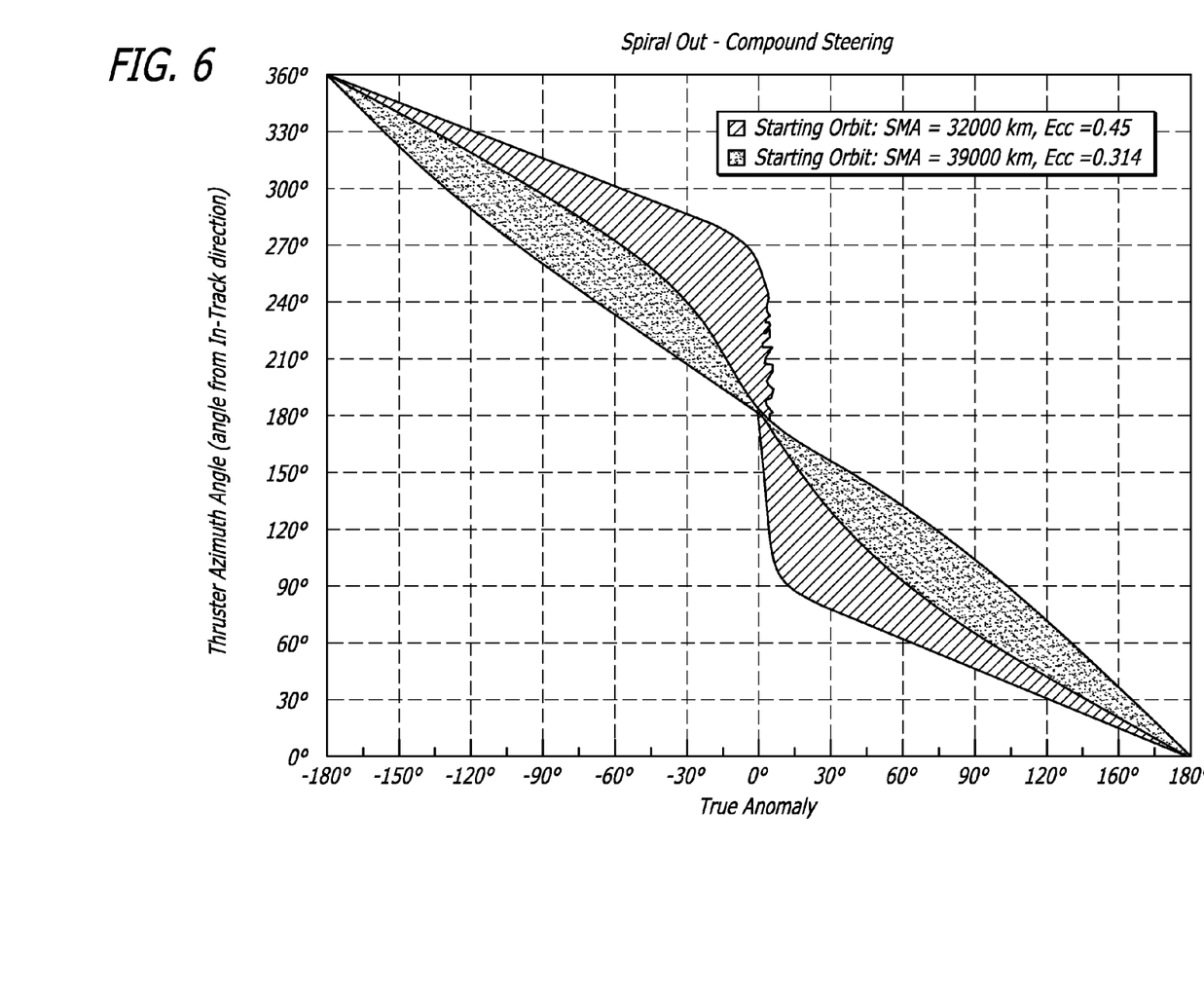
FIG. 6 shows the thruster azimuth angle profile as a function of the orbit true anomaly angle over the entire transfer using the disclosed compound steering law for a sub-synchronous eccentric initial orbit (i.e. spiral out), in accordance with at least one embodiment of the present disclosure.
Figure 7:
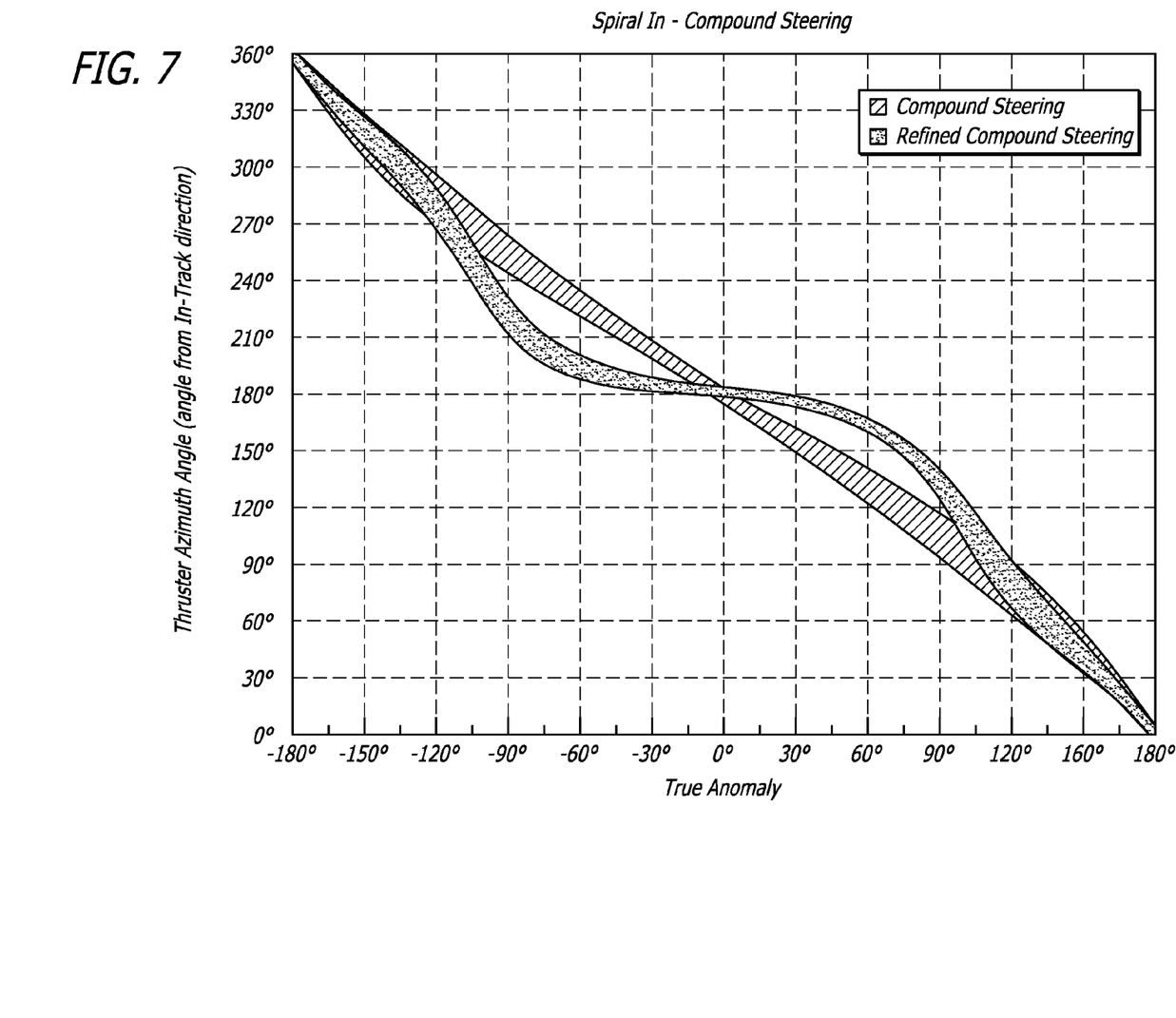
FIG. 7 shows the thruster azimuth angle profile as a function of the orbit true anomaly angle over the entire transfer using the disclosed compound steering law and the disclosed refined compound steering law for a super-synchronous eccentric initial orbit (i.e. spiral in), in accordance with at least one embodiment of the present disclosure.

FIGS. 6 and 7 each show a simulated thruster azimuth angle profile as a function of orbit true anomaly angle over the entire transfer for sub-synchronous (i.e. spiral out) and super-synchronous (i.e. spiral in) eccentric orbit cases. In particular, FIG. 6 shows the thruster azimuth angle profile as a function of the orbit true anomaly angle over the entire transfer using the disclosed compound steering law for a sub-synchronous eccentric initial orbit (i.e. spiral out), and FIG. 7 shows the thruster azimuth angle profile as a function of the orbit true anomaly angle over the entire transfer using the disclosed compound steering law and the disclosed refined compound steering law for a super-synchronous eccentric initial orbit (i.e. spiral in).

It should be noted that in FIGS. 6 and 7, the thrust vector azimuth angle profile for these cases has a noticeably uniform trend across the entire transfer orbit mission. In other words, the thrust vector continuously, uniformly, and smoothly steers over every orbit and throughout the transfer orbit mission. This observed thrust vector steering behavior, which is based on the disclosed compound steering law and refined compound steering law, is the reason for the continuous and simultaneous changes to the orbit eccentricity and semi-major axis parameters throughout the transfer orbit mission. These results are in sharp contrast to standard or conventional strategy based transfer cases, where the azimuth angle has abrupt transitions over an orbit revolution and/or an entire transfer.

For FIGS. 6 and 7, the azimuth angle in this reference frame is defined as the angle between the local orbital velocity vector and the spacecraft thrust vector. Thus, a zero-degree azimuth angle means that the thrust vector is aligned with the local velocity vector and, therefore, the ΔV imparted to the orbit is posi-grade. A 180° azimuth angle value means that the thrust vector is aligned with the local anti-velocity vector and, therefore, the ΔV imparted to the orbit is retro-grade.

Figure 8A:
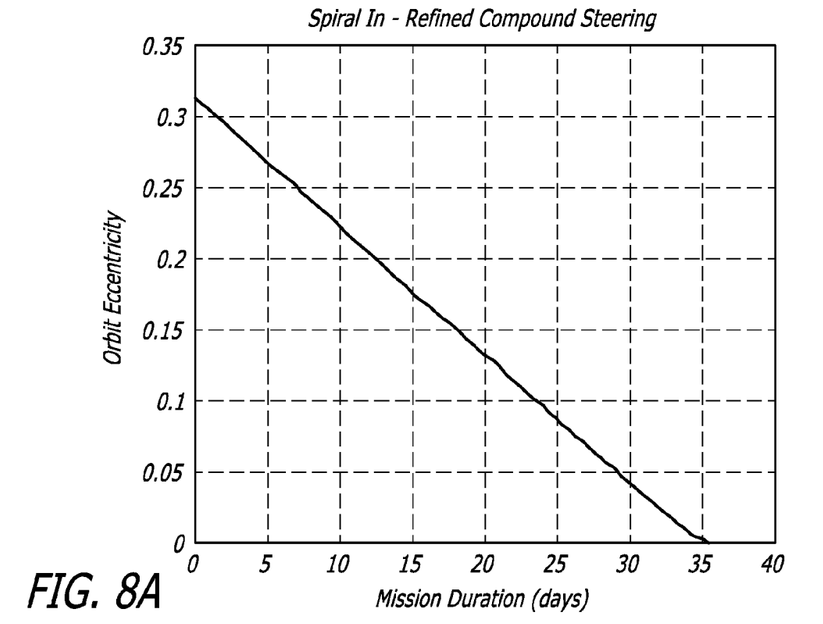
FIG. 8A shows the orbit eccentricity profile as a function of transfer orbit duration using the disclosed refined compound steering law for a super-synchronous eccentric initial orbit (i.e. spiral in), in accordance with at least one embodiment of the present disclosure.
Figure 8B:
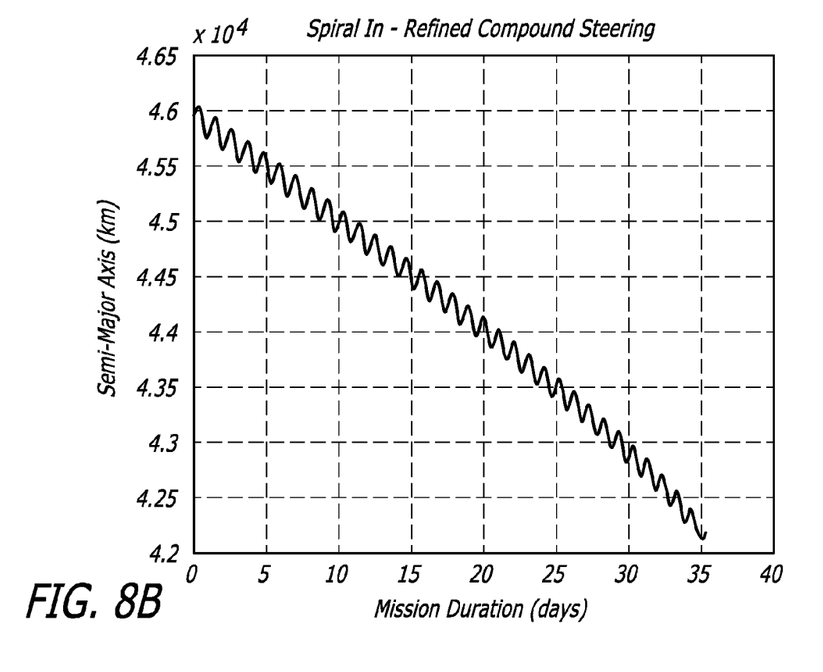
FIG. 8B shows the semi-major axis profile as a function of transfer orbit duration using the disclosed refined compound steering law for a super-synchronous eccentric initial orbit (i.e. spiral in), in accordance with at least one embodiment of the present disclosure.
Figure 8C:
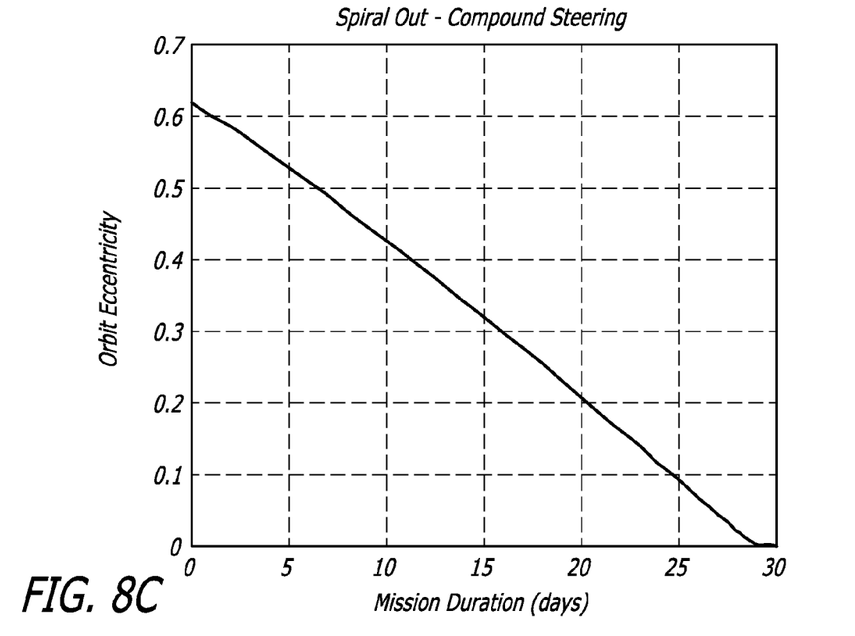
FIG. 8C shows the orbit eccentricity profile as a function of transfer orbit duration using the disclosed compound steering law for a sub-synchronous eccentric initial orbit (i.e. spiral out), in accordance with at least one embodiment of the present disclosure.
Figure 8D:
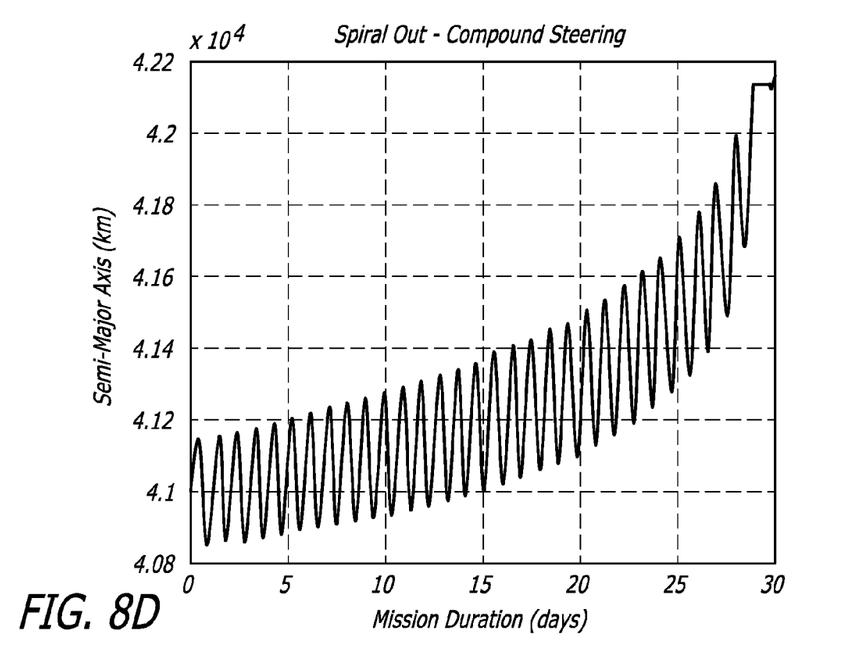
FIG. 8D shows the semi-major axis profile as a function of transfer orbit duration using the disclosed compound steering law for a sub-synchronous eccentric initial orbit (i.e. spiral out), in accordance with at least one embodiment of the present disclosure.

FIGS. 8A, 8B, 8C, and 8D show simulated orbit eccentricity and semi-major axis profiles as a function of transfer orbit duration (TOD) when using the compound steering law for super-synchronous and sub-synchronous eccentric initial orbit cases. In particular, FIG. 8A shows the orbit eccentricity profile as a function of transfer orbit duration using the disclosed refined compound steering law for a super-synchronous eccentric initial orbit (i.e. spiral in), FIG. 8B shows the semi-major axis profile as a function of transfer orbit duration using the disclosed refined compound steering law for a super-synchronous eccentric initial orbit (i.e. spiral in), FIG. 8C shows the orbit eccentricity profile as a function of transfer orbit duration using the disclosed compound steering law for a sub-synchronous eccentric initial orbit (i.e. spiral out), and FIG. 8D shows the semi-major axis profile as a function of transfer orbit duration using the disclosed compound steering law for a sub-synchronous eccentric initial orbit (i.e. spiral out). The compound steering law simulation results shown in these figures demonstrate that a simultaneous and continuous change to both the orbit semi-major axis and eccentricity parameters are achieved throughout the transfer orbit mission.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for application of a compound steering law for efficient low thrust transition orbit trajectory for a spacecraft, the method comprising:
   calculating, with at least one processor, a desired orbit for the spacecraft;
   calculating, with the at least one processor, a velocity change required to achieve an orbit eccentricity that corresponds to the desired orbit for the spacecraft;
   calculating, with the at least one processor, a velocity change required to achieve a semi-major axis that corresponds to the desired orbit for the spacecraft;
   calculating, with the at least one processor, a direction of a vector sum of the velocity change required to achieve the orbit eccentricity and the velocity change required to achieve the semi-major axis; and
   firing at least one thruster of the spacecraft in the direction of the vector sum in order to change a current orbit of the spacecraft to the desired orbit for the spacecraft, thereby changing the orbit eccentricity and the semi-major axis simultaneously.

2. The method of claim 1, wherein the spacecraft is one of a satellite, a pseudo satellite, a rocket, a launch vehicle, and a space plane.

3. The method of claim 2, wherein the EPS is a xenon-ion propulsion system (XIPS).

4. The method of claim 2, wherein the LPS employs at least one of a monopropellant and a bipropellant.

5. The method of claim 1, wherein the spacecraft employs at least one of a liquid propulsion system (LPS) and an electrical propulsion system (EPS).

6. The method of claim 1, wherein the method is performed during a transfer orbit mission for the spacecraft.

7. The method of claim 1, wherein the transition orbit mission changes from at least one of a lower Earth orbit (LEO), a medium Earth orbit (MEO), geosynchronous Earth orbit (GEO), a highly elliptical orbit (HEO), an inter-planetary orbit, and a lunar orbit mission to at least one of a target LEO, MEO, GEO, HEO, inter-planetary orbit, and lunar orbit for the spacecraft.

8. The method of claim 1, wherein the transition orbit mission changes an initial geo-synchronous eccentric orbit of the spacecraft to a target geo-synchronous circular orbit for the spacecraft.

9. The method of claim 1, wherein the transition orbit mission changes an initial sub-synchronous eccentric orbit of the spacecraft to a target geo-synchronous circular orbit for the spacecraft.

10. The method of claim 1, wherein the transition orbit mission changes an initial super-synchronous eccentric orbit of the spacecraft to a target geo-synchronous circular orbit for the spacecraft.

11. The method of claim 1, wherein the method is performed during an on-station mission for the spacecraft.

12. The method of claim 1, wherein the method is performed with a fixed transfer orbit duration (TOD) in order to maximize payload capacity.

13. The method of claim 1, wherein the method is performed with a variable TOD in order to minimize the TOD for a fixed payload capacity.

14. A method for application of a compound steering law for efficient low thrust transition orbit trajectory for a spacecraft, the method comprising:
- calculating, with at least one processor, a desired orbit for the spacecraft;
- calculating, with the at least one processor, a velocity change required to achieve an orbit eccentricity that corresponds to the desired orbit for the spacecraft;
- calculating, with the at least one processor, a velocity change required to achieve a semi-major axis that corresponds to the desired orbit for the spacecraft;
- calculating, with the at least one processor, a direction of a vector sum of the velocity change required to achieve the orbit eccentricity and the velocity change required to achieve the semi-major axis;
- calculating, with the at least one processor, a factor w that is a function of an absolute value of the velocity change required to achieve the semi-major axis divided by the velocity change required to achieve the orbit eccentricity;
- calculating, with the at least one processor, a factor x that is a function of an orbit true anomaly angle of the current orbit for the spacecraft; and
- firing at least one thruster of the spacecraft in the direction of the vector sum times the factor x in order to change a current orbit of the spacecraft to the desired orbit for the spacecraft, thereby changing the orbit eccentricity and the semi-major axis simultaneously.

15. The method of claim 14, wherein the spacecraft employs at least one of a LPS and an EPS.

16. The method of claim 15, wherein the EPS is a XIPS.

17. The method of claim 15, wherein the LPS employs at least one of a monopropellant and a bipropellant.

18. The method of claim 14, wherein the method is performed during a transfer orbit mission for the spacecraft.

19. The method of claim 14, wherein the method is performed during an on-station mission for the spacecraft.

20. A system for application of a compound steering law for efficient low thrust transition orbit trajectory for a spacecraft, the system comprising:
- at least one processor configured for calculating a desired orbit for the spacecraft,
- wherein the at least one processor is further configured for calculating a velocity change required to achieve an orbit eccentricity that corresponds to the desired orbit for the spacecraft, and a velocity change required to achieve a semi-major axis that corresponds to the desired orbit for the spacecraft,
- wherein the at least one processor is further configured for calculating a direction of a vector sum of the velocity change required to achieve the orbit eccentricity and the velocity change required to achieve the semi-major axis; and
- at least one thruster on the spacecraft is configured for firing in the direction of the vector sum in order to change a current orbit of the spacecraft to the desired orbit for the spacecraft, thereby changing the orbit eccentricity and the semi-major axis simultaneously.

* * * * *